US009190078B2

(12) United States Patent
Sapozhnikov et al.

(10) Patent No.: US 9,190,078 B2
(45) Date of Patent: Nov. 17, 2015

(54) DUAL READER STRUCTURE

(71) Applicant: Seagate Technology LLC, Cupertino, CA (US)

(72) Inventors: Victor Boris Sapozhnikov, Minnetonka, MN (US); Harry Edelman, Minneapolis, MN (US); Mohammed Sharia Ullah Patwari, Eden Prairie, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 14/014,597

(22) Filed: Aug. 30, 2013

(65) Prior Publication Data
US 2015/0062735 A1 Mar. 5, 2015

(51) Int. Cl.
G11B 5/39 (2006.01)
G11B 5/115 (2006.01)

(52) U.S. Cl.
CPC .............. G11B 5/115 (2013.01); G11B 5/3948 (2013.01); G11B 5/3951 (2013.01)

(58) Field of Classification Search
CPC ................ G11B 5/3954; G11B 2005/3996; G11B 5/3945; G11B 5/3948; G11B 5/3951; G11B 5/115
USPC .................................. 360/314–316
See application file for complete search history.

(56) References Cited

U.S. PATENT DOCUMENTS

| 4,179,720 | A | | 12/1979 | Miura | |
|---|---|---|---|---|---|
| 5,323,285 | A | * | 6/1994 | Smith | 360/315 |
| 6,597,546 | B2 | * | 7/2003 | Gill | 360/321 |
| 6,636,389 | B2 | * | 10/2003 | Gill | 360/314 |
| 6,643,103 | B1 | * | 11/2003 | Trindade | 360/314 |
| 6,680,827 | B2 | * | 1/2004 | Li et al. | 360/314 |
| 6,819,530 | B2 | * | 11/2004 | Gill | 360/314 |
| 6,828,785 | B2 | * | 12/2004 | Hosomi et al. | 324/252 |
| 7,324,303 | B2 | | 1/2008 | Ozue et al. | |
| 7,436,632 | B2 | * | 10/2008 | Li et al. | 360/315 |
| 7,551,393 | B2 | | 6/2009 | Biskeborn et al. | |
| 7,606,007 | B2 | * | 10/2009 | Gill | 360/319 |
| 7,630,176 | B2 | * | 12/2009 | Horng et al. | 360/324.11 |
| 7,656,610 | B1 | | 2/2010 | Campos et al. | |
| 7,751,148 | B1 | | 7/2010 | Alstrin et al. | |
| 8,437,106 | B2 | | 5/2013 | Yanagisawa et al. | |
| 8,462,467 | B2 | | 6/2013 | Yanagisawa et al. | |
| 8,531,801 | B1 | | 9/2013 | Xiao et al. | |
| 8,576,518 | B1 | | 11/2013 | Zeltser et al. | |
| 8,630,069 | B1 | | 1/2014 | Okawa et al. | |
| 8,638,530 | B1 | | 1/2014 | Hsu et al. | |
| 8,749,926 | B1 | | 6/2014 | Le et al. | |
| 8,760,820 | B1 | | 6/2014 | McKinlay et al. | |
| 8,780,505 | B1 | | 7/2014 | Xiao | |
| 8,780,506 | B1 | | 7/2014 | Maat et al. | |
| 8,797,692 | B1 | | 8/2014 | Guo et al. | |

(Continued)

FOREIGN PATENT DOCUMENTS

JP 58182115 A * 10/1983
KR 10-1998-0024100 7/1998

(Continued)

Primary Examiner — Will J Klimowicz
(74) Attorney, Agent, or Firm — HolzerIPLaw, PC

(57) ABSTRACT

Implementations described and claimed herein provide a stacked dual reader with a bottom sensor stack and a top sensor stack wherein the bottom sensor stack and the top sensor stack are mirrored along a down-track direction.

20 Claims, 4 Drawing Sheets

(56) References Cited

U.S. PATENT DOCUMENTS

| | | | |
|---|---|---|---|
| 2002/0067580 A1* | 6/2002 | Li et al. ........................ | 360/321 |
| 2004/0114280 A1 | 6/2004 | Yoshikawa et al. | |
| 2005/0068683 A1* | 3/2005 | Gill .............................. | 360/314 |
| 2005/0068684 A1* | 3/2005 | Gill .............................. | 360/314 |
| 2006/0002032 A1* | 1/2006 | Li et al. ........................ | 360/315 |
| 2009/0201612 A1 | 8/2009 | Shimazawa et al. | |
| 2012/0087045 A1 | 4/2012 | Yanagisawa et al. | |
| 2012/0087046 A1 | 4/2012 | Yanagisawa et al. | |

FOREIGN PATENT DOCUMENTS

| | | |
|---|---|---|
| KR | 10-2000-0076834 | 12/2000 |
| KR | 10-2001-0075690 | 8/2001 |

\* cited by examiner

DUAL READER STRUCTURE

BACKGROUND

In a magnetic data storage and retrieval system, a magnetic read/write head typically includes a reader portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary to recover the information encoded on the disc.

SUMMARY

Implementations described and claimed herein provide a stacked dual reader with a bottom sensor stack and a top sensor stack wherein the bottom sensor stack and the top sensor stack are mirrored along a down-track direction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWINGS

The described technology is best understood from the following Detailed Description describing various implementations read in connection with the accompanying drawings.

DETAILED DESCRIPTIONS

Figure 1:
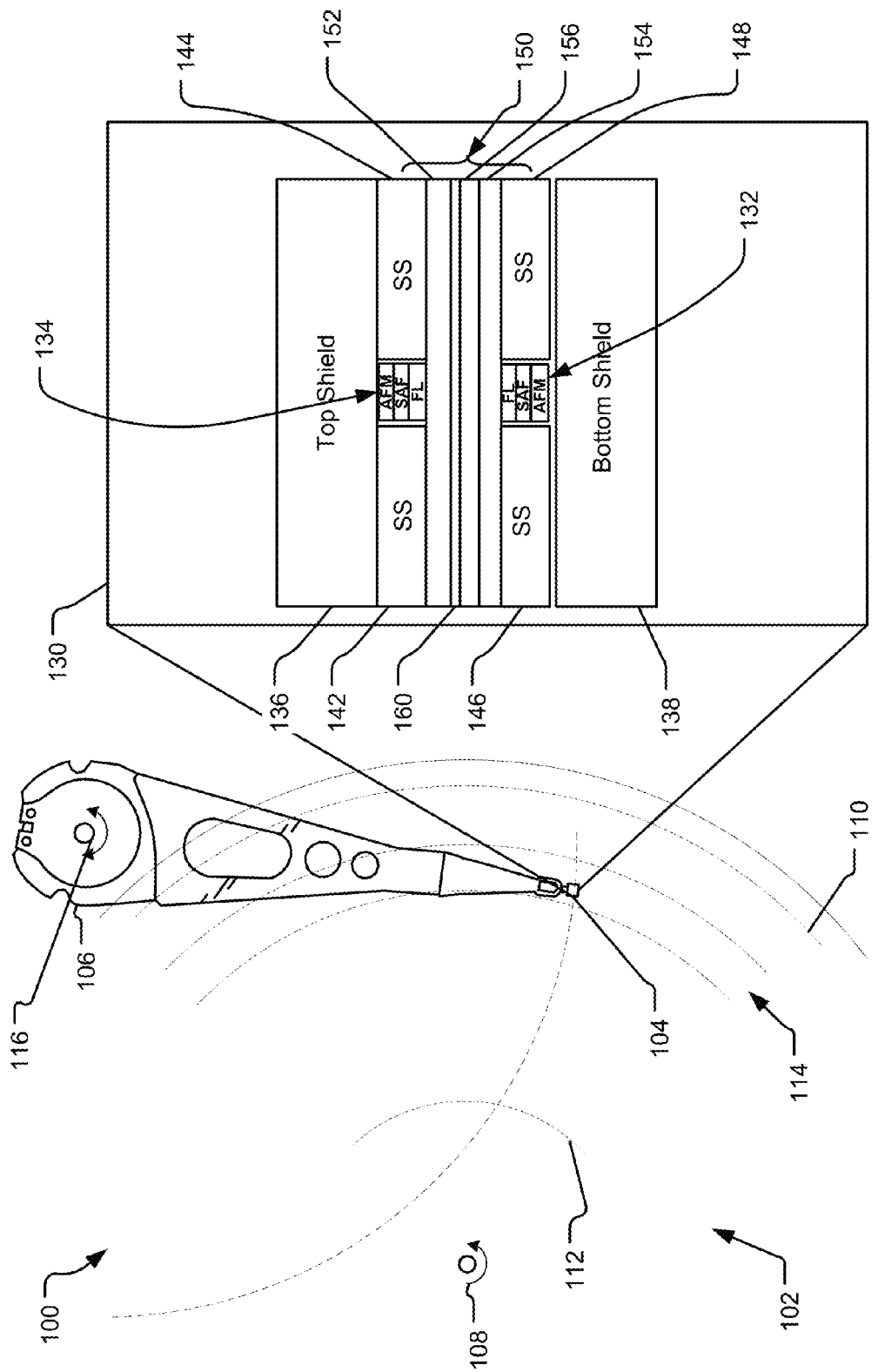
FIG. 1 illustrates an example block diagram illustrating an example read sensor structure implemented on an end of an actuator assembly.

In a magnetic data storage and retrieval system, a magnetic recording head typically includes a reader portion having a magnetoresistive (MR) sensor for retrieving magnetically encoded information stored on a magnetic disc. Magnetic flux from the surface of the disc causes rotation of the magnetization vector of a sensing layer or layers of the MR sensor, which in turn causes a change in electrical resistivity of the MR sensor. The sensing layers are often called "free" layers, since the magnetization vectors of the sensing layers are free to rotate in response to external magnetic flux. The change in resistivity of the MR sensor can be detected by passing a current through the MR sensor and measuring a voltage across the MR sensor. External circuitry then converts the voltage information into an appropriate format and manipulates that information as necessary to recover the information encoded on the disc.

MR sensors have been developed that can be characterized in three general categories: (1) anisotropic magnetoresistive (AMR) sensors, (2) giant magnetoresistive (GMR) sensors, including spin valve sensors and multilayer GMR sensors, and (3) tunneling giant magnetoresistive (TGMR) sensors.

Tunneling GMR (TGMR) sensors have a series of alternating magnetic and non-magnetic layers similar to GMR sensors, except that the magnetic layers of the sensor are separated by an insulating film thin enough to allow electron tunneling between the magnetic layers. The resistance of the TGMR sensor depends on the relative orientations of the magnetization of the magnetic layers, exhibiting a minimum for a configuration in which the magnetizations of the magnetic layers are parallel and a maximum for a configuration in which the magnetizations of the magnetic layers are antiparallel.

For all types of MR sensors, magnetization rotation occurs in response to magnetic flux from the disc. As the recording density of magnetic discs continues to increase, the width of the tracks as well as the bits on the disc must decrease. This necessitates increasingly smaller MR sensors as well as narrower shield-to-shield spacing (SSS). The SSS of the sensors determine the signal to noise ratio (SNR) of reader with higher SSS related to lower SNR. Thus, a reduction in the SSS leads to reduction in the value of the PW50 and therefore, an increase in the value of the SNR for the recording system.

Stacked dual readers promise a significant improvement of track density capability and data rate. In a stacked dual reader, two sensor stacks are stacked between a top shield and a bottom shield along a down-track direction. The two sensor stacks are separated by a mid-shield along the down-track direction. Furthermore, the sensor stacks are positioned between side shields along cross-track direction. The distance between top shield and mid-shield and between the mid-shield and bottom shield determine PW50 values in top reader and bottom reader, respectively. The distance between the two sensor stacks also determines the performance of the dual stacked reader under skew, with lower distance between the two sensors resulting in better performance under skew.

Stacked dual reader also includes mid-shields between the two sensor stacks along a down-track direction. The mid-shields are connected to leads that read the voltage across a sensor stack. If the current flowing in the leads across the two sensor stacks is in the same direction, that is, either from top to bottom of the stacked dual reader in a down-track direction or from bottom to top of the stacked dual reader in the down-track direction, the dual stacked reader exhibits higher stability and lower noise during the operation of the stacked dual reader as both currents flow in the favorable direction for the spin moment transfer (SMT). Therefore, in one implementation of the dual stacked reader, the two leads connected to the mid-shields have opposite polarities.

However, such opposite polarities increases the potential for leakage across the two mid-shields and thus requires a thick insulator between the mid-shields. In turn, such increased thickness of the insulator increases the distance between the two sensors resulting in poor performance of the stacked dual reader under skew. Furthermore, the increased thickness of the insulator also increases the distance between top shield and mid-shield and between the mid-shield and bottom shield, thus resulting in higher PW50 values in top reader and bottom reader, respectively.

An implementation of a stacked dual reader disclosed herein reduces the SSS between the top shield and the bottom shield as well as the distance between the two sensors along the down-track direction by mirroring the two sensor stacks along a down-track direction such that the free layers (FLs) of the two sensor stacks are closer to each other. In other words, in the implementations disclosed herein, the FLs of each of the two sensor stacks are closer to the mid-shield separating the two sensors compared to the synthetic antiferromagnetic (SAF) layers of the two sensor stacks. An implementation of the stacked dual sensor provides the leads attached to the mid-shield to have the same polarity.

FIG. 1 illustrates an example block diagram illustrating an example read sensor structure implemented on an end of an actuator assembly 100. Specifically, FIG. 1 illustrates a plan view of an implementation of a disc 102 with a transducer head 104 situated on an end of an actuator assembly 106. Disc 102 rotates about a disc axis of rotation 108 during operation. Further, disc 102 includes an outer diameter 110 and inner diameter 112 between which are a number of data tracks 114, illustrated by circular dotted lines. Data tracks 114 are substantially circular and are made up of regularly spaced patterned bits.

Information may be written to and read from the patterned bits on the data tracks 114 through the use of the actuator assembly 106, which rotates during a data track 114 seek operation about an actuator axis of rotation 116 positioned adjacent the disc 102. The transducer head 104 mounted on the actuator assembly 106 at an end distal from the actuator axis of rotation 116 flies in close proximity above the surface of the disc 102 during disc operation. The transducer head 104 includes recording head including a read sensor for reading data from the track 114 and a write pole for writing data to the track 114.

To read data from the magnetic disk 102, transitions on the track 114 of the disk 102 creates magnetic fields. As the read sensor passes over the transitions, the magnetic fields of the transitions modulate the resistance of the read sensor. The change in the resistance of the read sensor is detected by passing a sense current through the read sensor and then measuring the change in voltage across the read sensor. The resulting resistance-based voltage signal is used to recover data encoded on the track of the disk 102.

FIG. 1 also illustrates an expanded air-bearing surface (ABS) view of a partial cross-sectional configuration of a read sensor 130 wherein the read sensor may be located on the transducer head 104. Specifically, the read sensor 130 is a stacked dual sensor including a bottom sensor stack 132 and a top sensor stack 134 located between a top shield 136 and a bottom shield 138 along down-track direction. Each of the bottom sensor stack 132 and a top sensor stack 134 includes an FL, a SAF, and an AFM. Furthermore, the top sensor stack 134 is arranged between top side shields 142 and 144 whereas the bottom sensor stack 132 is arranged between bottom side shields 146 and 148.

In the illustrated implementation, the bottom sensor stack 132 and the top sensor stack 134 have opposite arrangement of various layers in a down-track direction. Thus, for example while the bottom sensor stack 132 includes an FL, a SAF, and an AFM arranged such that the AFM is closer to the bottom shield 138, the top sensor stack 134 includes an FL, a SAF, and an AFM arranged such that the AFM is closer to the top shield 136. In other words, along the down-track direction, the order of the various layers in the bottom sensor stack 132 is opposite the order of various layers in the top sensor stack 134.

The bottom sensor 132 and the top sensor 134 are separated from each other along the down-track direction by a top mid-shield 152 and a bottom mid-shield 154. Each of the mid-shields 152 and 154 may be made of a permalloy material. In one implementation, an AFM layer 156 separates the top mid-shield 152 from the bottom mid-shield 154 along the down-track direction. Furthermore, the AFM layer 156 is insulated from the top mid-shield 152 by an insulation layer 160.

The arrangement of the bottom sensor 132 and the top sensor 134 in a manner illustrated in FIG. 1 results in lower distance between the FL of the bottom sensor 132 and the FL of the top sensor 134. As the magnetization of the FL is used in reading magnetic information from magnetic media, the lower distance between the two FLs results in better performance of the stacked dual reader in the presence of skew. In one implementation, the down-track distance between a free layer of the top sensor 134 and a free layer of the bottom sensor 132 is approximately in the range of 10 nm to 40 nm.

In implementations of stacked dual readers where the sequence of the layers in both the top sensor stack and the bottom sensor stack are the same (not disclosed), there are two possibilities: (1) The polarity of the current on the two sides of the insulation layers is opposite. This is a favorable situation from the point of view of noise and instability created by SMT but it creates a stress on the thin insulation layer. (2) Alternatively, the polarity of the current on the two sides of the insulation layers is the same. This reduces the stress on the insulation layer but can create noise and instability due to SMT.

Compared to that, in the implementation shown in FIG. 1 the benefits of reduced noise and instability and the reduced stress on the insulation layer are achieved in the same design. The polarity of current on two sides of insulation layer 160 is the same, which reduces the stress on the insulation layer 160. Furthermore, the polarity of currents can be chosen such that in both readers it substantially reduces the noise and instability coming from the spin moment transfer (SMT) that may be generated by mismatch between the sequence of layers and the polarity of an electrode attached thereto.

While the implementation of the stacked dual reader 130 includes the bottom mid-shield 154, the AFM layer 156, and the top mid-shield 152, in an alternative implementation, only the bottom mid-shield 154 and the AFM layer 156 may be provided. Such an implementation with a single mid-shield further reduces the distance between the FLs of the bottom sensor 132 and the top sensor 134, further improving the performance of the stacked dual reader 130 in the presence of skew. Moreover, the implementation with a single mid-shield also removes the need for an insulator layer between the AFM layer 156 in the mid-shield and the top mid-shield 152.

Figure 2:
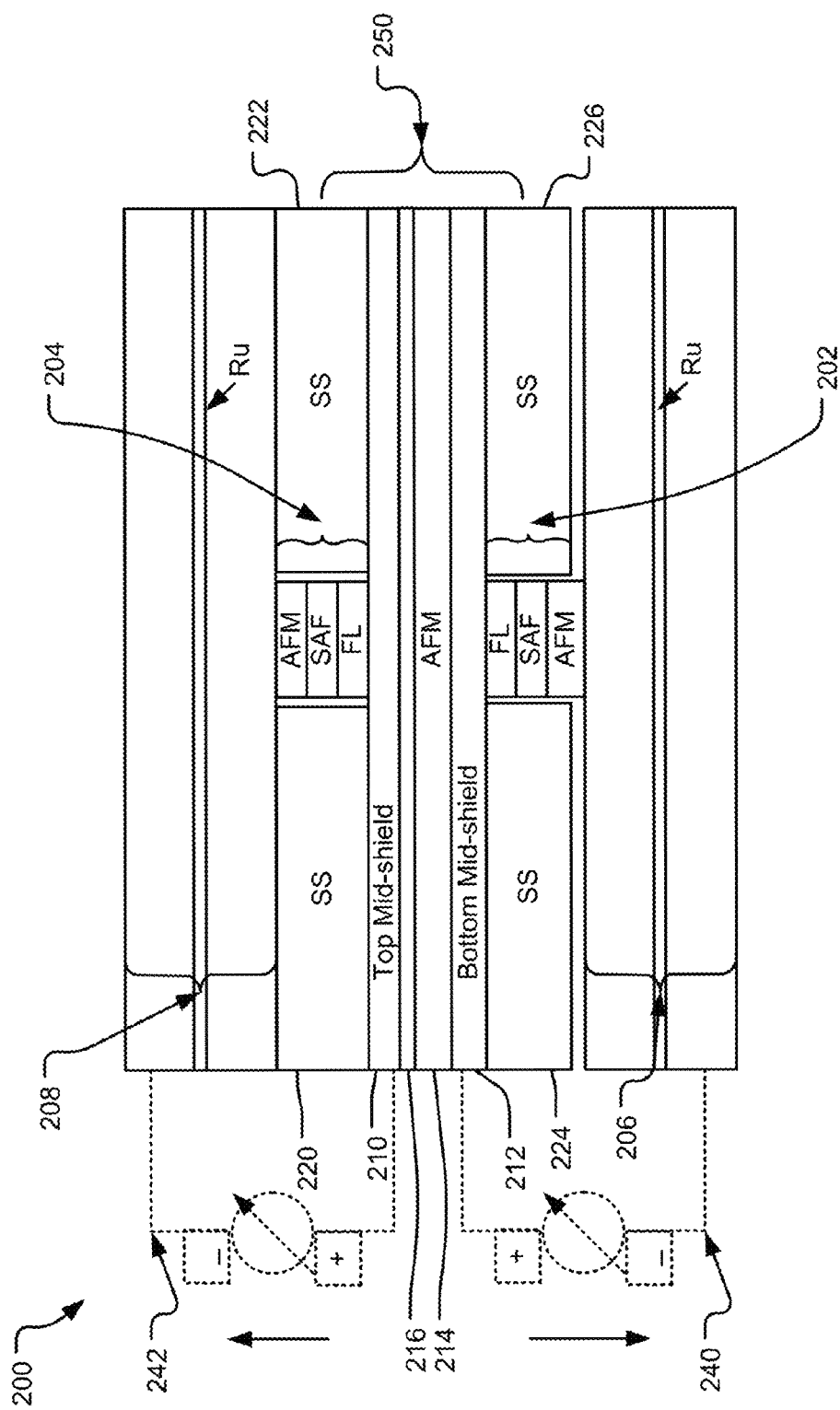
FIG. 2 illustrates an example block diagram of a stacked dual reader according to an implementation disclosed herein.

FIG. 2 illustrates an example block diagram of a stacked dual reader 200 according to an implementation disclosed herein. The stacked dual reader 200 includes a bottom sensor stack 202 and a top sensor stack 204 arranged along a down-track direction between a bottom shield 206 and a top shield 208. The bottom sensor stack 202 is arranged between the bottom shield 206 and a bottom mid-shield 212, whereas the top sensor stack 204 is arranged between the top shield 208 and a top mid-shield 210. Furthermore, the top sensor stack 204 is arranged between top side shields 220 and 222 along a cross-track direction. The bottom sensor stack 202 is arranged between bottom side shields 224 and 226. Each of the bottom sensor stack 202 and the top sensor stack 204 includes a free layer (FL), a SAF layer, and an AFM layer.

Each of the bottom shield 206 and the top shield 208 may be configured in the form of a synthetic antiferromagnetic (SAF) structures. Thus, the top shield 208 includes a reference layer (RL) and a pinned layer (PL) separated by a thin layer of non-magnetic material, such as ruthenium (Ru) to provide RKKY coupling between the RL and the PL. Similarly, the bottom shield 206 also includes a reference layer (RL) and a pinned layer (PL) separated by a thin layer of non-magnetic material, such as ruthenium (Ru) to provide RKKY coupling between the RL and the PL. The direction of magnetization in the RL and PL layers of the top shield 208 and the bottom shield 206 are antiparallel to each other.

The stacked dual reader 200 also includes a mid-shield AFM layer 214 that is adjacent to the bottom mid-shield 212 and an insulation layer 216 between the mid-shield AFM layer 214 and the top mid-shield 210 along a down-track direction. In one implementation, the mid-shields 210 and 212 may be made of a permalloy materials.

The signal generated by the bottom sensor stack 202 is read using bottom electrical leads 240 that are attached to the bottom shield 206 and the bottom mid-shield 212. On the other hand, the signal generated by the top sensor stack 204 is read using top electrical leads 242 that are attached to the top shield 208 and the top mid-shield 210. Because the mirrored sequence of layers in the bottom sensor stack 202 compared to the top sensor stack 204, the direction of the current generated in the two sensor stacks is also opposite along the down-track direction. As a result, the two layers on two sides of the insulation layer 216, namely the top mid-shield 210 and the bottom mid-shield 212 have the same polarity (in the illustrated implementation, positive). This reduces the stress that may be generated on the insulation layer 216 and therefore, a thinner insulation layer 216 may be used in the stacked dual reader 200. Furthermore, the SMT related performance degradation can be reduced in both readers as the polarity of the electrodes attached to the layers of the stacked dual reader can be made favorable in both stacks.

Furthermore, due to the mirrored arrangement of the sensor stacks, the FLs of the top sensor stack 204 and the bottom sensor stack 202 are closer to each other, in effect reducing the distance 250 between the two FLs. The reducing of the distance 250 results in better performance of the stacked dual reader 200 in presence of skew.

Figure 3:
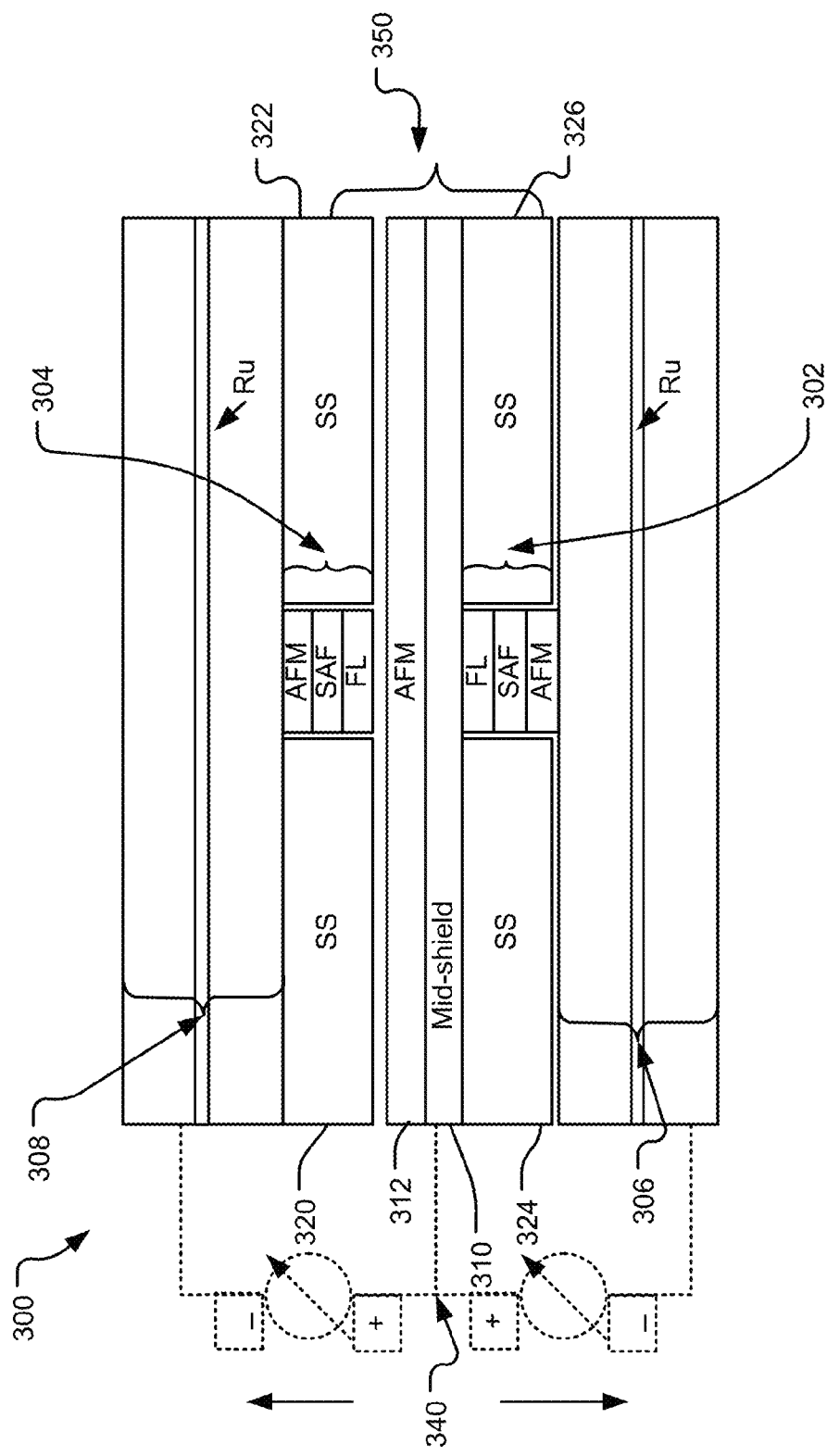
FIG. 3 illustrates a partial block diagram of a stacked dual reader according to an alternative implementation disclosed herein.

FIG. 3 illustrates an example block diagram of a stacked dual reader 300 according to an implementation disclosed herein. The stacked dual reader 300 includes a bottom sensor stack 302 and a top sensor stack 304 arranged along a down-track direction between a bottom shield 306 and a top shield 308. The bottom sensor stack 302 is arranged between the bottom shield 306 and a mid-shield 310, whereas the top sensor stack 304 is arranged between the top shield 308 and an AFM layer 312 of the mid-shield 310. Furthermore, the top sensor stack 204 is arranged between top side shields 320 and 322 along a cross-track direction. The bottom sensor stack 302 is arranged between bottom side shields 324 and 326. Each of the bottom sensor stack 302 and the top sensor stack 304 includes a free layer (FL), a SAF layer, and an AFM layer.

Reversing the sequence of layers (along a down-track direction) in the top sensor stack 304 and the bottom sensor stack 302 allows using a single mid-shield layer 310 without any insulation layer between the two sensor stacks. As a result, a three-lead pre-amplifier circuit 340 may be used to collect signals from the two sensors of the stacked dual reader 300. Using a three-lead pre-amplifier circuit 340 reduces the number of electrode connections to the stacked dual reader 300, thus reducing SMT related noise. Furthermore, removal of the insulation layer further reduces a distance 350 between the FLs of the two sensor stacks, thus improving the performance of the stacked dual reader in the presence of skew. Although there is a space between the FL and the AFM layer, such a space is not filled by insulative material. In one implementation, the down-track distance between a free layer of the top sensor stack 304 and a free layer of the bottom sensor stack 302 is approximately in the range of 10 nm to 40 nm.

Figure 4:
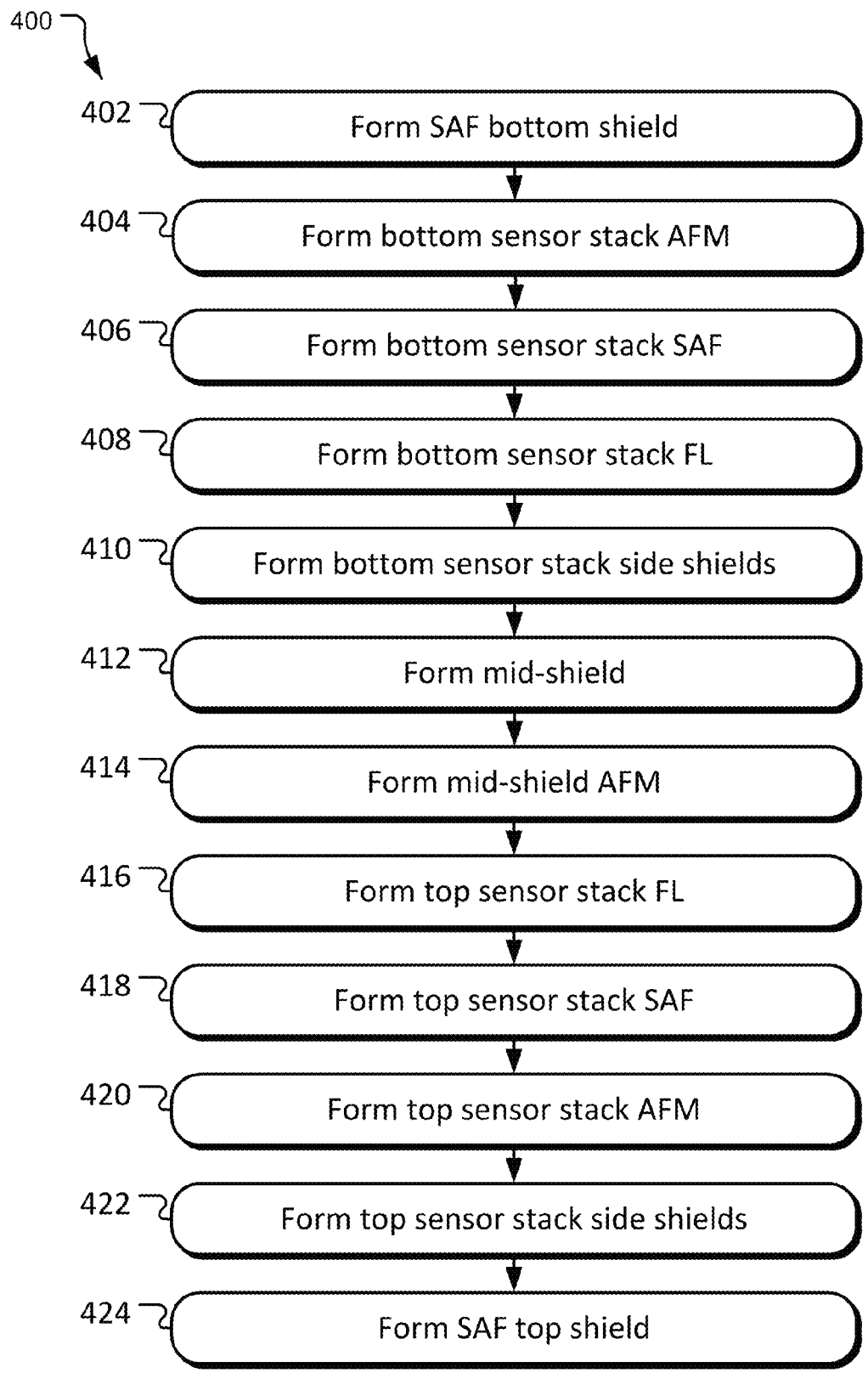
FIG. 4 illustrates example operations for creating a stacked dual reader according to an implementation disclosed herein.

FIG. 4 illustrates example operations 400 for creating a stacked dual reader according to an implementation disclosed herein. Specifically, the various operations 402 to 424 disclose one sequence of forming a dual stacked reader disclosed herein. While these operations disclose one sequence, one or more of these operations may be performed in an alternative order. An operation 402 forms an SAF bottom shield, which may include forming a reference layer (RL) and a pinned layer (PL) separated by a thin layer of non-magnetic material, such as ruthenium (Ru). Operations 404-408 form the bottom sensor stack, including forming an AFM layer of the bottom sensor stack (404), an SAF layer of the bottom sensor stack (406), and forming a FL of the bottom sensor stack (408). Note that in an alternative implementation, the bottom sensor stack may also include other layers, such as a capping layer on top of the FL, etc.

Subsequently, the side shields of the bottom reader are formed on two sides (in a cross-track direction) of the bottom sensor stack by an operation 410. Operations 412 and 414 form a first mid-shield and a mid-shield AFM, respectively. In an alternative implementation, a second mid-shield may also be formed adjacent to the mid-shield AFM.

Operations 416-420 form the top sensor stack, including forming a FL of the top sensor stack (416), an AFM layer of the top sensor stack (418), and a SAF layer of the top sensor stack (420). The order in which the various layers of the top sensor stack are formed in reverse compared to the order in which the layers of the bottom sensor are formed. Furthermore, in an alternative implementation, the top sensor stack may also include other layers, such as a capping layer on top of the FL (between the FL and the mid-shield layer), etc. Subsequently, an operation 422 forms the side shields of the top reader on two sides (in a cross-track direction) of the top sensor stack and an operation 424 forms an SAF top shield.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. An apparatus comprising:
a stacked dual reader with a bottom sensor stack and a top sensor stack, wherein the bottom sensor stack and the top sensor stack are mirrored along a down-track direction, and wherein a mid-shield separates the bottom sensor stack and the top sensor stack; a pre-amplifier circuit comprising a lead connected to the mid-shield, configured to collect current flowing from the mid-shield through the top sensor stack in the presence of an external field opposite a direction of current flowing from the mid-shield through the bottom sensor stack in the presence of the external field.

2. The apparatus of claim 1 wherein the bottom sensor stack is arranged between a bottom SAF shield and a bottom mid-shield with a free layer of the bottom sensor stack being adjacent to the bottom mid-shield and wherein the top sensor stack is arranged between a top SAF shield and a top mid-shield with a free layer of the top sensor stack being adjacent to the top mid-shield.

3. The apparatus of claim 1 wherein a down-track distance between a free layer of the top sensor stack and a free layer of the bottom sensor stack is approximately in the range of 10 nm to 40 nm.

4. The apparatus of claim 1, wherein the bottom sensor stack is arranged between a bottom shield and the mid-shield and the top sensor stack is arranged between a top shield and an AFM layer of the mid-shield.

5. A dual reader, comprising:
a bottom sensor stack and a top sensor stack separated by at least one mid-shield; a pre-amplifier circuit comprising a first lead connected to the mid-shield, configured to collect current flowing from the mid-shield through the top sensor stack in the presence of an external field opposite a direction of current flowing from the mid-shield through the bottom sensor stack in the presence of the external field.

6. The dual reader of claim 5, wherein the bottom sensor stack and the top sensor stack are mirrored along a down-track direction.

7. The dual reader of claim 5, wherein the bottom sensor stack includes an AFM layer in contact with a bottom shield and the top sensor stack includes an AFM layer in contact with a top shield.

8. The dual reader of claim 5, wherein there is no insulation layer between the bottom sensor stack and the top sensor stack.

9. The dual reader of claim 5, wherein a down-track distance between a free layer of the top sensor stack and a free layer of the bottom sensor stack is approximately in the range of 10 nm to 40 nm.

10. The dual reader of claim 5, wherein the pre-amplifier circuit comprises a three-lead pre-amplifier circuit configured to read a signal from the dual reader, wherein the first lead is one of the three leads of the pre-amplifier circuit.

11. The dual reader of claim 10, wherein a second lead of the three-lead pre-amplifier circuit is connected to a top shield and a third lead of the three-lead pre-amplifier circuit is connected to a bottom shield.

12. The dual reader of claim 5, wherein the bottom sensor stack is arranged between a bottom shield and the mid-shield and the top sensor stack is arranged between a top shield and an AFM layer of the mid-shield.

13. A storage device comprising:
a magnetic media;
a dual reader including a bottom sensor stack and a top sensor stack, wherein a mid-shield separates the bottom sensor stack and the top sensor stack; a pre-amplifier circuit comprising a first lead connected to the mid-shield, configured to collect current flowing from the mid-shield through the top sensor stack in the presence of an external field opposite a direction of current flowing from the mid-shield through the bottom sensor stack in the presence of the external field.

14. The storage device of claim 13, wherein the top sensor stack and the bottom sensor stack are mirrored along a down-track direction.

15. The storage device of claim 13, wherein a polarity of a signal generated by the bottom sensor stack is opposite the polarity of a signal generated by the top sensor stack.

16. The storage device of claim 13, wherein signals generated by the dual reader are read by three leads of the pre-amplifier circuit, wherein the first lead is one of the three leads of the pre-amplifier circuit.

17. The storage device of claim 16, wherein a second lead of the three-lead pre-amplifier circuit is connected to a top shield and a third lead of the three-lead pre-amplifier circuit is connected to a bottom shield.

18. The storage device of claim 13, wherein the bottom sensor stack includes an AFM layer in contact with a bottom shield and the top sensor stack includes an AFM layer in contact with a top shield.

19. The storage device of claim 13, wherein there is no insulation layer between the bottom sensor stack and the top sensor stack.

20. The storage device of claim 13, wherein the bottom sensor stack is arranged between a bottom shield and the mid-shield and the top sensor stack is arranged between a top shield and an AFM layer of the mid-shield.

* * * * *